(12) United States Patent
Schuster et al.

(10) Patent No.: US 9,909,296 B2
(45) Date of Patent: Mar. 6, 2018

(54) TOILET FASTENER ASSEMBLY AND METHOD OF USE

(71) Applicant: Danco, Inc., Irving, TX (US)

(72) Inventors: Michael J. Schuster, Shorewood, IL (US); Dwayne A. Porter, Lockport, IL (US)

(73) Assignee: DANCO, INC., Irving, TX (US)

( * ) Notice: Subject to any disclaimer, the term of this patent is extended or adjusted under 35 U.S.C. 154(b) by 206 days.

(21) Appl. No.: 14/710,043

(22) Filed: May 12, 2015

(65) Prior Publication Data
US 2015/0322662 A1 Nov. 12, 2015

Related U.S. Application Data

(60) Provisional application No. 61/991,727, filed on May 12, 2014.

(51) Int. Cl.
*E03D 11/00* (2006.01)
*E03D 11/16* (2006.01)
*F16B 35/00* (2006.01)

(52) U.S. Cl.
CPC .............. *E03D 11/16* (2013.01); *F16B 35/00* (2013.01); *Y10T 29/49432* (2015.01)

(58) Field of Classification Search
CPC ......... E03D 11/16; E03D 1/113; E03D 11/13; F16B 35/00; F16L 23/02; Y10T 29/49428; Y10T 29/4943

USPC ...................................... 29/890.141; 4/252.1
See application file for complete search history.

(56) References Cited

U.S. PATENT DOCUMENTS

| | | | |
|---|---|---|---|
| 5,421,036 A | 6/1995 | Stevens et al. | |
| 6,254,141 B1 | 7/2001 | Piper | |
| 7,743,435 B2 | 6/2010 | Serret | |
| 8,210,785 B1 | 7/2012 | Gager | |
| 9,169,629 B2 * | 10/2015 | Jensen | E03D 1/26 |
| D766,069 S * | 9/2016 | Miller | D8/349 |
| 2013/0326801 A1 | 12/2013 | Junca | |
| 2013/0333105 A1 | 12/2013 | Monat | |
| 2015/0322661 A1* | 11/2015 | Duncan | E03D 11/16 29/890.141 |
| 2015/0368891 A1* | 12/2015 | Miller | E03D 11/16 4/252.1 |

* cited by examiner

*Primary Examiner* — Huyen Le
(74) *Attorney, Agent, or Firm* — Ross Barnes LLP; Monty L. Ross; Robin L. Barnes (57) ABSTRACT

An adjustable-length toilet fastener assembly and method for use wherein the constituent components are cooperatively configured to provide height adjustability without cutting or breaking parts of the assembly for various installation environments and floor configurations when securing a toilet to an underlying support such as a closet collar or other mounting flange. In one embodiment, a tightening tool provided as part of the subject assembly is engageable with and concealed by a low-profile decorative cap.

14 Claims, 10 Drawing Sheets

TOILET FASTENER ASSEMBLY AND METHOD OF USE

FIELD OF THE INVENTION

This invention relates to adjustable-length fasteners such as bolts and screws that can be used to install and secure toilets to support structures, particularly underlying support structures such as subfloors, collars, flanges, drain pipes and the like.

DESCRIPTION OF RELATED ART

Traditionally, a toilet is installed over a drain pipe using a closet collar secured to the subfloor in fluid communication with the drain pipe. A fluid seal such as a wax ring or other similarly effective sealing member is desirably positioned between a downwardly projecting outlet horn of the toilet base that is insertable into the closet collar to prevent fluid leakage that can otherwise occur when the toilet is flushed. In a conventional toilet installation, the toilet base is typically secured to the flange portion of the closet collar with a long threaded bolt, sometimes called a "toilet bolt" or "floor bolt" that is positioned to be insertable upwardly through an aperture or bolt hole disposed on each side of the toilet base. A nut is sometimes threaded onto an externally threaded section of the floor bolt above the closet collar before the toilet base is lowered over the bolt. Desirably, the bolts then protrude through the toilet bolt holes on each side of the toilet base a sufficient distance to permit the installation of another nut that secures the toilet base to the closet collar. A washer is often but not always used between the toilet base and the nut, and the nut (most often a conventional hex nut) is tightened with a wrench and then covered with a decorative cap or bolt cover. Conventional bolt covers can have a height equal to or greater than the diameter of the base, which is needed if a substantial portion of the bolt length remains exposed above the nut. Such bolt covers or caps can be more difficult to clean and sanitize around during routine housekeeping.

Because subfloor thicknesses can vary significantly and differences are often encountered when installing toilets, the floor bolts are typically made longer than is usually necessary to assure that they will extend through the toilet bolt holes regardless of the subfloor configuration. If they are too long, however, the bolts must be shortened prior to applying the decorative cap. In such cases, the excess length at the top of the bolt above the nut is sawed off with a tool such as a hacksaw to permit a decorative bolt cover to be installed over the washer and nut. Alternatively, the bolts are made with weakened areas that can be snapped with pliers or other similarly effective tools. These conventional bolt assemblies and methods pose several common problems that establish a need for an improved technology. The need for using hand tools to saw off or break bolts in locations that are often cramped and confining poses a significant hindrance to both professional installers and do-it-yourself ("DIY") consumers. Any sawing or breaking of the bolt ends in a confined space between the toilet and a nearby wall or sink can require the installer to assume awkward positions with a limited range of movement. Breaking the bolts can bend the bolts or damage threads, and over-tightening the nuts with a wrench can crack or fracture a toilet base.

Recently, others have disclosed various toilet bolt configurations and fastener assemblies. For example, U.S. Pat. No. 8,210,785 discloses an externally threaded floor bolt, a cooperatively threaded cylindrical insert (or multiple sleeves to accommodate different sized floor bolts), and a nut having a flat top and a cylindrically shaped stem. In use, the insert threads onto the floor bolt, the toilet is set over the insert, and the nut is threaded downwardly into the top of the insert. In one embodiment, the top of the nut is adapted for use of a screwdriver to tighten the assembly, and another embodiment provides wrench flats for use in tightening. The need for adjustable lengths is not disclosed except in the context of utilizing a "hack saw or the like" to cut off the tops of the bolts if necessary. A disc-shaped decorative cap that either snaps onto or rotates into engagement (bayonet with quarter-turn) with the flat top nut is also disclosed.

U.S. Pub. No. 2013/0326801 A1 discloses a fastener assembly having a base configured to be inserted into a flange slot and an upwardly projecting bolt shaft having an inner bore that is externally and internally threaded. The external threads are configured to receive a nut member securing the base and bolt shaft to the flange, and the internal threads are configured to receive external threads disposed at the distal end of a cap. The use of a removable guide post or guide bolt is disclosed that is configured to engage the inner bore of the bolt shaft to assist in aligning the bolt shaft with a bolt hole in the toilet base.

A need remains, however, for an adjustable length toilet bolt assembly that does not requires the use of hand tools when seating a toilet base on the flange portion of a closet collar and that can be used interchangeably with the OEM bolt cap or with a low-profile bolt cap provided as part of the assembly.

SUMMARY OF THE INVENTION

This invention offers new advantages and provides a solution to difficulties commonly encountered during toilet installation, including without limitation eliminating the need for using hand tools when setting the toilet base; simplifying installation over a wide range of drain, closet flange, floor, and toilet configurations; and avoiding the need for large or unsightly toilet bolt caps and the cleaning problems often associated with the use of traditional toilet installation hardware and accessories. With the present invention, a plurality of coaxially alignable, cooperatively engageable fastener sections provides height adjustability without the need for sawing or breaking bolts, and facilitates the use of either a low profile bolt cap provided with the assembly or another bolt cap such as an OEM cap supplied with the toilet. The low profile bolt cap is desirably directly attachable to one of the cooperatively engageable fastener sections or to a fastener tightening tool that is incorporated in some embodiments of the apparatus of the invention.

One embodiment of the invention comprises a tee bolt or other similarly effective fastener section that is insertable through a channel in an underlying flange or closet collar to anchor the fastener assembly of the invention to the underlying support. The tee bolt also facilitates the height adjustability feature of the invention, and desirably comprises both external threads and an internally threaded axial bore. A stabilizing collar is desirably provided as part of the subject fastener assembly to be engageable with and support the portion of the tee bolt projecting above the flange or closet collar. The stabilizing collar can be threaded or unthreaded and desirably assists in resisting wobbling of the tee bolt while trying to lower the toilet into a desired position in which the tee bolt is aligned with bolt holes or other apertures in the toilet base. The stabilizing collar also desirably resists rotation of the tee bolt around its longitudinal axis relative to the flange of a closet collar during tightening of the fastener assembly of the invention.

Another embodiment of the invention optionally comprises an extension member that is coaxially alignable and cooperatively engageable with the tee bolt to further enhance the overall height adjustability of the assembly.

Another embodiment of the invention optionally comprises an alignment guide such as a guide post or bolt bullet that is selectively and releasably engageable with the tee bolt or with an extension member, during subsequent threading operations by resisting axial rotation of the tee bolt relative to the closet collar.

Another embodiment of the invention comprises an adjustable length tightening member that is desirably coaxially alignable and cooperatively engageable with the tee bolt or with an extension member of the subject toilet fastener assembly. According to one preferred embodiment of the invention, the tightening member is a hex bolt having threads that are engageable with a tee bolt or with an extension member connected to a tee bolt. According to another preferred embodiment of the invention, the tightening member comprises a bolt section that is engageable with a tee bolt or extension member and also comprises an integrally fabricated or unitarily formed head section that can be hand-tightened without the use of tools.

Another embodiment of the invention comprises a tightening tool that can be manually manipulated without hand tools to tighten the subject fastener assembly to secure a toilet base to an underlying support such as the flange portion of a closet collar. According to one preferred embodiment of the invention, the tightening tool is either releasably attachable to the tightening member, or is formed as an integral or unitarily formed part of the tightening member, and desirably applies torque to tighten the other parts of the subject fastener assembly while avoiding the need for wrenches that may be difficult to use in confined spaces or unavailable to non-professional or DIY users. According to another preferred embodiment of the invention, the tightening tool is engageable with the head of a hex bolt and once engaged, is attachable to and concealable under a low-profile bolt cover that is also desirably provided as part of the subject fastener assembly. The subject bolt caps desirably provide clean and attractive surfaces at the toilet bolt attachment locations and facilitate routine cleaning while also limiting exposure of the upper portions of the fastener assembly to contact with potentially corrosive fluids.

According to another embodiment of the invention, the length or height adjustability features of the invention, such as can be achieved through the use of cooperatively threaded parts as disclosed here in the preferred embodiments, desirably accommodates various thicknesses of floors or subfloors and different toilet base configurations without the need for providing overly long bolts that typically require the use of saws or bolt cutters to complete a toilet installation, and without the use of a wrench to tight tighten the subject fastener assembly.

Depending upon factors such as part configuration, anticipated load requirements, available fabrication methods, materials and equipment, use environment and cost considerations, parts of some preferred fastener assemblies of the invention are desirably, but not necessarily, constructed of metals, or can be made using durable polymeric materials or other materials that are similarly satisfactory for the intended use. For example, the structure, function and appearance of the bolt cap component of the invention suggest manufacture using a moldable thermoplastic polymeric material. For other parts, machined nylon extrusions may be preferable for some applications. According to one embodiment of the invention, some parts can be combined. For example, the bolt cap, tightening tool and tightening member may be combined into a single part that is either pre-assembled, insert molded or unitarily formed but retains the desired functionality of each constituent part, whether or not separately identified as in another embodiment of the invention.

According to another embodiment of the invention, a method for installing a toilet base onto a support structure such as the flange portion of a closet collar is also disclosed. One preferred embodiment of the method of the invention comprises inserting a floor bolt such as a tee bolt into a support flange; placing a toilet base over the bolt; inserting a tightening member through an aperture in the base of the toilet and into engagement with the bolt; providing a tightening tool to apply torque to the tightening member; applying manual force to the tightening tool to torque the tightening member relative to the tee bolt with the tightening tool; and covering the tightening tool with a cap.

It will be appreciated by those of skill in the art upon reading this disclosure that various alterations and modifications to the embodiments particularly disclosed here can be made within the scope of the invention. For example, the "tee bolt" element of the invention can be cooperatively configured together with a closet collar or other flange or support surface to have a different shape, profile, or slightly different functionality while still exhibiting the principal functional capabilities as disclosed here. Similarly, the "stabilizing collar" as disclosed here can have many different configurations that engage or cooperate with the tee bolt in slightly different ways while still achieving the objectives of resisting "wobble" of the tee bolt during toilet installation and resisting rotational movement of the tee bolt relative to the support member when the fastener assembly of the invention is adjusted and tightened. Similarly, the configuration of the internal and external threads of some components of the subject toilet fastener assembly can be reversed to produce systems of comparable performance. For instance, the lower bolt may be solid with external threads, and may selectively interface with a hollow upper bolt with internal threads or an extension adapter with a hollow, internally-threaded lower end. Alternatively, the upper and lower bolts may be solid with external threads and the extension adapter may be hollow with internal threads on both the upper and lower ends. Several such permutations can be easily conceived without undue experimentation and are believed to be within the scope of the invention.

BRIEF DESCRIPTION OF THE DRAWINGS

The apparatus of the invention is further described and explained in relation to the following drawings wherein.

DESCRIPTION OF THE PREFERRED EMBODIMENT

Figure 1:
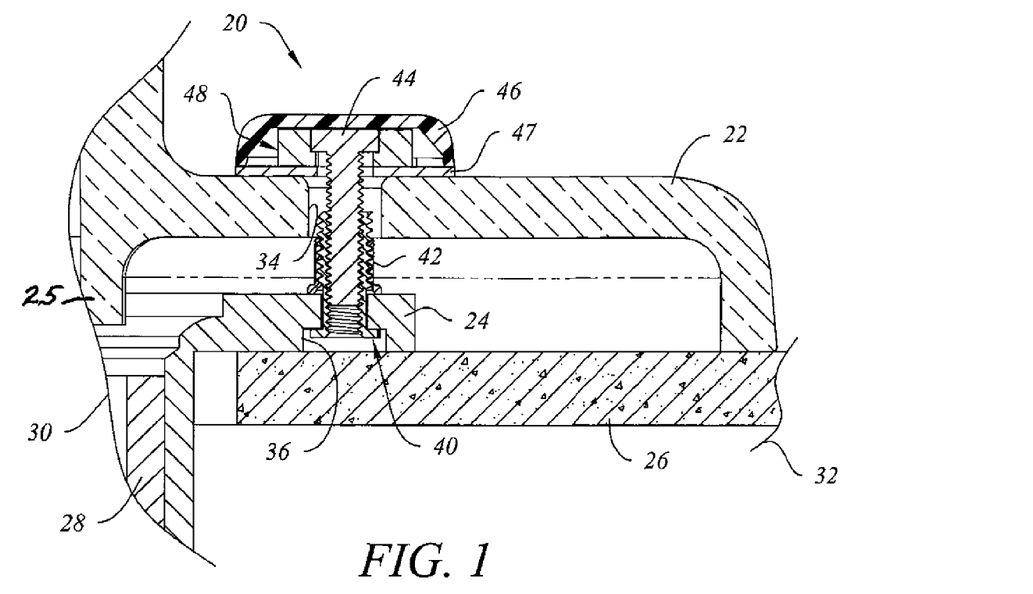
FIG. 1 is a cross-sectional front elevation view of one embodiment of the toilet fastener assembly of the invention as installed.

Referring to FIG. 1, a toilet fastener assembly 20 is shown as installed in a use environment in which toilet base 22 is seated over a support structure comprising a flange portion of closet collar 24 that is installed in and around an opening in subfloor 26. A fluid seal, such as a wax ring or another similarly effective fluid seal, is typically installed between the downwardly facing fluid outlet horn 25 of toilet base 22 and closet collar 24 but is not part of the subject fastener assembly and is not shown in this illustration to simplify the drawing. Closet collar 24 is depicted as installed over an upwardly facing open end of drain pipe 28, although it will be appreciated by those of skill in the art that in other installations where the subject fastener assembly is used, the structure and positional relationship of closet collar 24 and drain pipe 30 can vary from that shown in FIG. 1. Line segments 30, 32 are provided as indicators that the portions of the installation as shown are broken away from the complete toilet installation. In a conventional toilet installation, one toilet fastener assembly 20 is disposed on each side of toilet base 22.

Toilet fastener assembly 20 further comprises a floor bolt such as tee bolt 40, which is desirably used in combination with a closet collar 24 having an arcuately extending channel 36 on its underside into which tee bolt 40 is insertable from above, as is further described below in relation to FIG. 4. Tee bolt 40 projects upwardly from closet collar 24 and is optionally but desirably stabilized in the position shown by a member such as stabilizing collar 42 or by another similarly effective element configured to perform the same or similar functions as those discussed in this disclosure. An aligned and cooperatively configured tightening member shown here in the form of hex-head bolt 44 is inserted downwardly through an aperture such as bolt hole 34 in toilet base 22. In the embodiment shown in FIG. 1, tee bolt 40 comprises external threads engageable with cooperatively configured internal threads of stabilizing collar 42, and an internally threaded longitudinal bore that is cooperatively engageable with external threads of hex-head bolt 44. Washer 47 is optionally disposed around hex-head bolt 44 to reduce friction and facilitate tightening of fastener assembly 20 relative to the upwardly facing surface of toilet base 22. Washer 47 can also aid in preventing debris from falling into the annulus between the shaft portion of hex-head bolt 44 and the side wall of bolt hole 34 in toilet base 22. Although tee bolt 40, stabilizing collar 42 and hex-head bolt 44, when configured as depicted in FIG. 1, are an embodiment useful in practicing the apparatus and method of the invention, it should be appreciated that other thread configurations or other similarly effective engagement elements can be used as the floor bolt, stabilizing collar and tightening member of the invention if they are adjustable within a predetermined range of overall lengths that is believed to accommodate toilet installation in a variety of subfloor structures typically encountered by a user.

Still referring to FIG. 1, tightening tool 48 is desirably releasably engageable with the head portion of hex-head bolt 44 and provides leverage that enables a user to apply sufficient torque to the hex head of bolt 44 to satisfactorily tighten fastener assembly 20 to secure toilet base 22 to closet collar 24 and subfloor 26. A low-profile, decorative cap 46 is desirably provided for optional use in place of an OEM toilet bolt cover. As used here, "low-profile" desirably refers to a toilet bolt cover having a diameter that is greater than its height. According to one embodiment of the invention, decorative cap 46 is engageable with tightening tool 48. The underside of decorative cap 46 is desirably provided with structural elements configured to cooperate with structural elements of tightening tool 48 to facilitate snap-fit or bayonet type engagement. In one preferred embodiment of the invention, tightening tool 48 is provided with structural elements as are further described below in relation to FIG. 3 to facilitate engagement cooperating structural elements on the underside of low-profile decorative cap 46.

Figure 2:
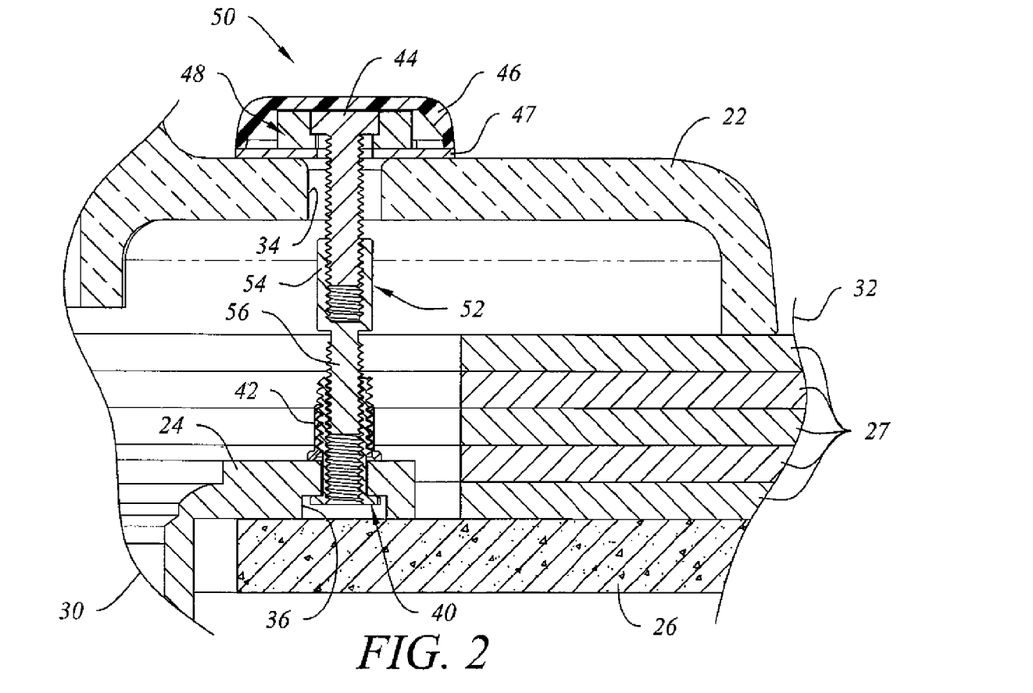
FIG. 2 is a cross-sectional front elevation view of another embodiment of the toilet fastener assembly of the invention as installed in a floor having greater thickness than in FIG. 1, demonstrating the height adjustability feature of the invention as expanded through use of an extension member.

Referring to FIG. 2, fastener assembly 50 of the invention is similarly disclosed in relation to toilet base 22 and subfloor 26. In this view, a different floor configuration is depicted, comprising additional layers 27 that increase the height of toilet base 22 when installed over subfloor 26 and illustrate the possible need for a greater range of height adjustability than may be achieved using fastener assembly 20 of FIG. 1. In addition to the elements described above, fastener assembly 50 further comprises extension member 52 having an internally threaded upper section 54 and an externally threaded lower section 56. In this embodiment of the invention, upper section 54 is coaxially aligned with and configured to be cooperatively engageable with the downwardly extending shaft portion of hex-head bolt 44, and lower section 56 is coaxially aligned with and configured to be cooperatively engageable with the internal bore of tee bolt 40.

Figure 3:
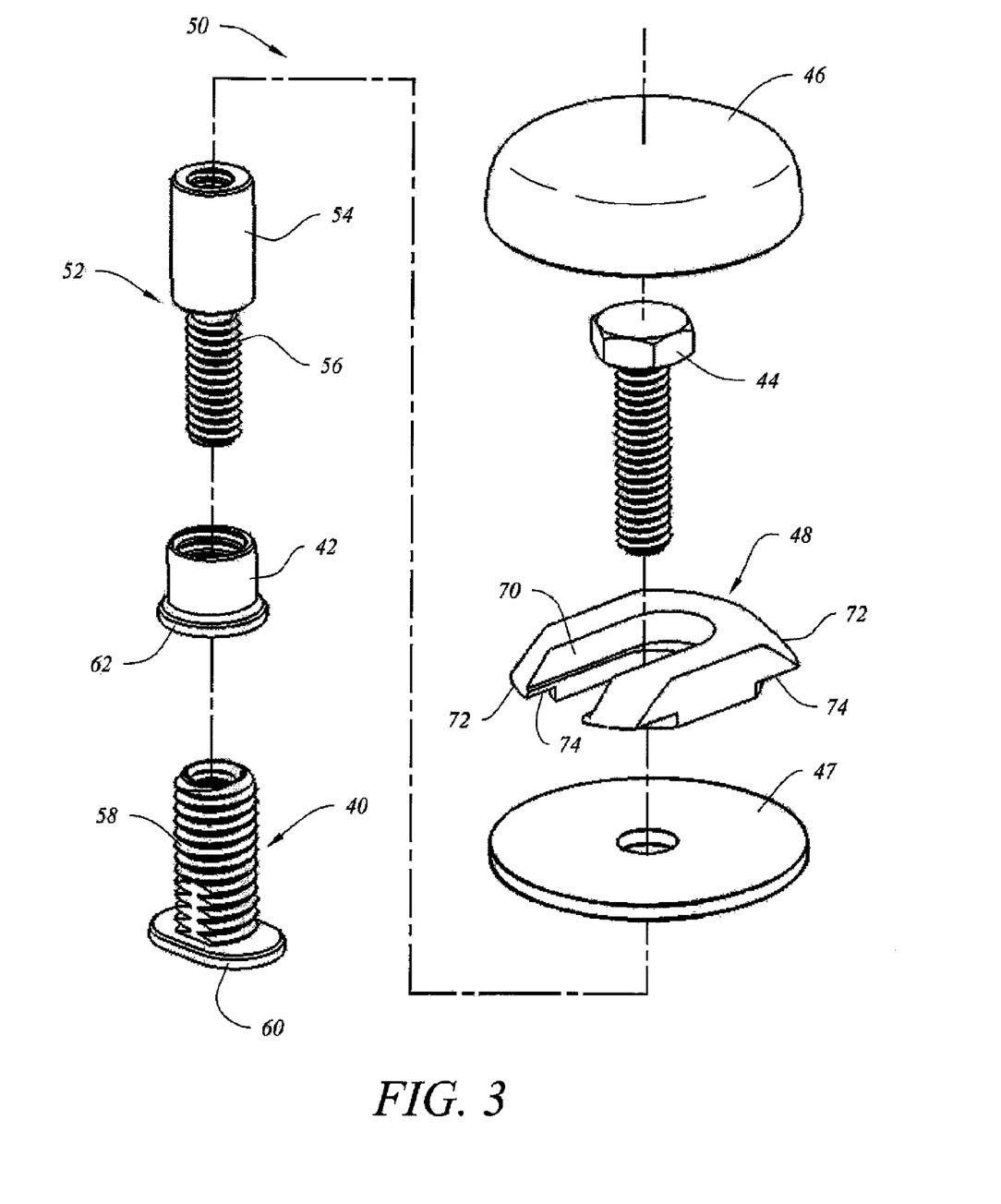
FIG. 3 is an exploded perspective view of the toilet fastener assembly of FIG. 2.
Figure 4:
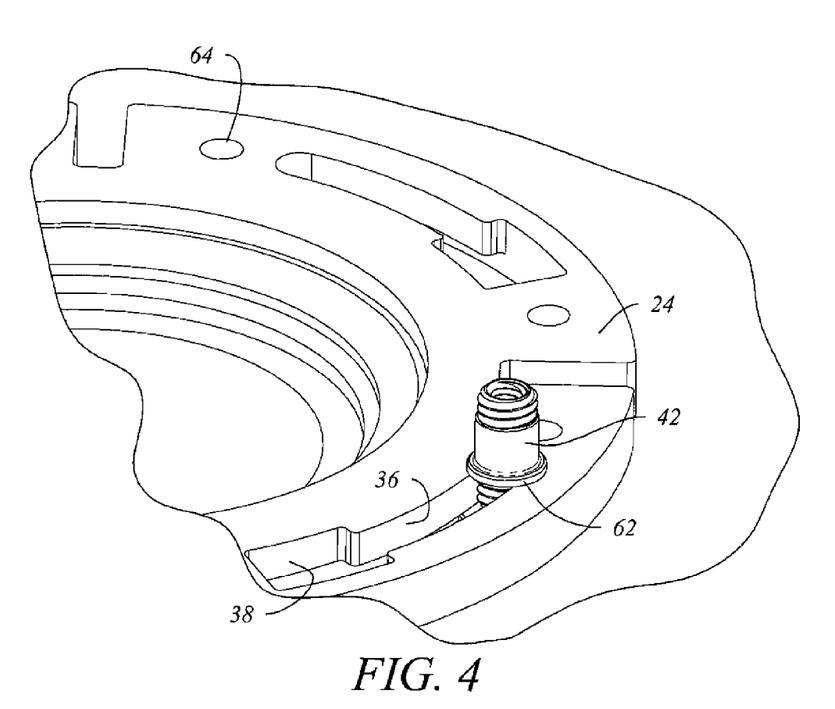
FIG. 4 is a detail perspective view of the tee bolt and stabilizing collar of FIG. 2 as installed in a closet collar during practice of a method of the invention.
Figure 5:
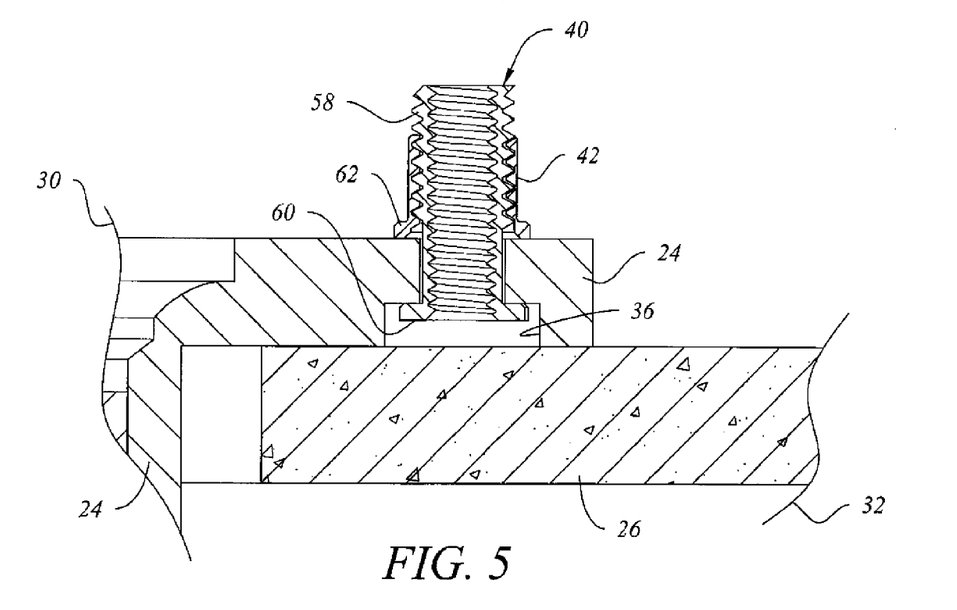
FIG. 5 is a detail cross-sectional front elevation view of the flange portion of the closet collar, tee bolt, and stabilizing collar as installed during practice of a method of the invention.

Referring to FIGS. 3-6, elements of toilet fastener assembly 50 are depicted in exploded and detail views to facilitate further description of the structure and use of tee bolt 40, stabilizing collar 42, extension member 52, washer 47, tightening tool 49, hex-head bolt 44 and low-profile decorative cap 46 in practicing an embodiment of the method of the invention. Tee bolt 40 desirably comprises an upwardly facing shaft portion 58 and an elongated base portion 60. As shown, shaft portion 58 is provided with internal and external threads. Stabilizing collar 42 comprises an internally threaded cylindrical section and a larger diameter base 62 that increases the surface area in contact with the upper surface of closet collar 24. Referring more particularly to FIGS. 4 and 5, base 62 of tee bolt 40 is installed in closet collar 24 by positioning base 62 over receiving section 38 of arcuate channel 36 and then sliding tee bolt 40 along channel 36 to a position more closely adjacent to the end of channel 36 that is opposite receiving section 38. Stabilizing collar 42 is then threaded downwardly onto the top of tee bolt 40 until the underside of base 62 engages and is hand-tightened against the top surface of closet collar 24. Stabilizing collar 42 is not required for all floor bolt configurations but is desirably provided as part of toilet fastener assembly 50 and restricts movement of tee bolt 40 relative to closet collar 24 and facilitates the alignment of tee bolt 40 and extension member 52 with bolt hole 34 (FIG. 2) when the toilet base is lowered into place during installation.

Figure 6:
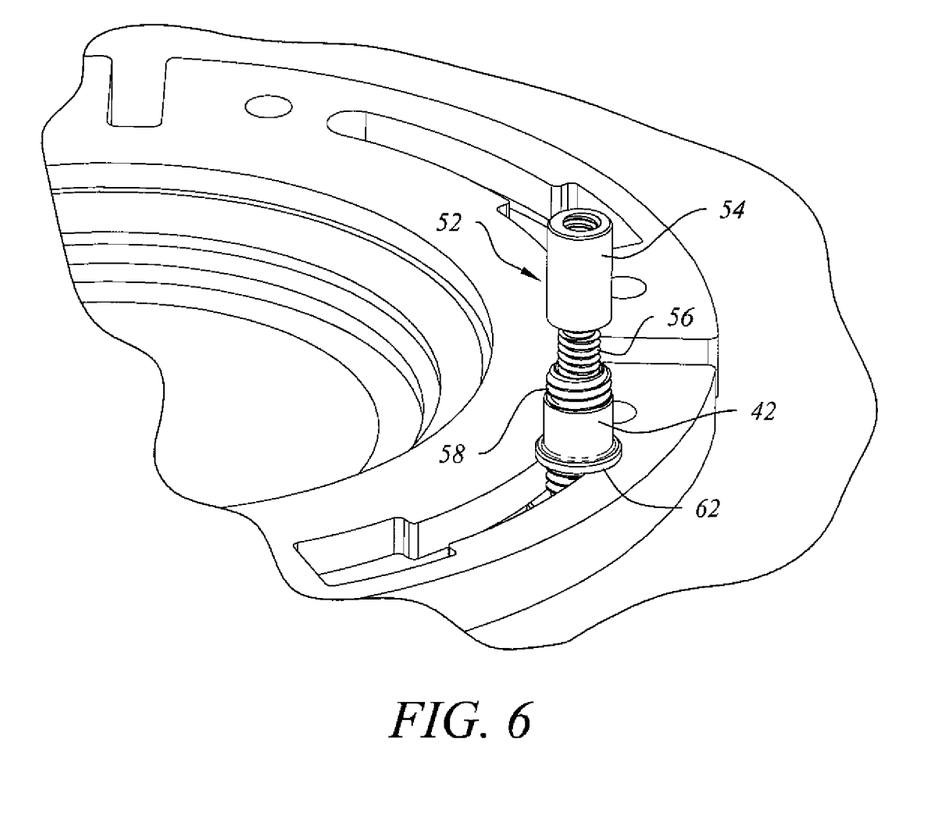
FIG. 6 is a detail view as in FIG. 5, with an extension member threaded into the tee bolt.

Referring to FIG. 6, extension member 52 is optionally provided and is depicted with lower section 56 threaded into engagement with the internally threaded bore of shaft portion 58 of tee bolt 40. It should be appreciated upon reading this disclosure that the lengths of cooperatively engageable shaft portion 58 and lower section 56 of extension member 52 will affect the overall length of assembled toilet fastener assembly 50 and the range of vertical distances between closet collar 24 and toilet base 22 (FIG. 2) with which toilet fastener assembly 50 can be effectively used. Where extension member 52 is not provided or used in the toilet installation method of the invention, as in toilet fastener assembly 20 in FIG. 1, the overall range of length or height adjustability is reduced in comparison to the embodiment of toilet fastener assembly 50.

Figure 7:
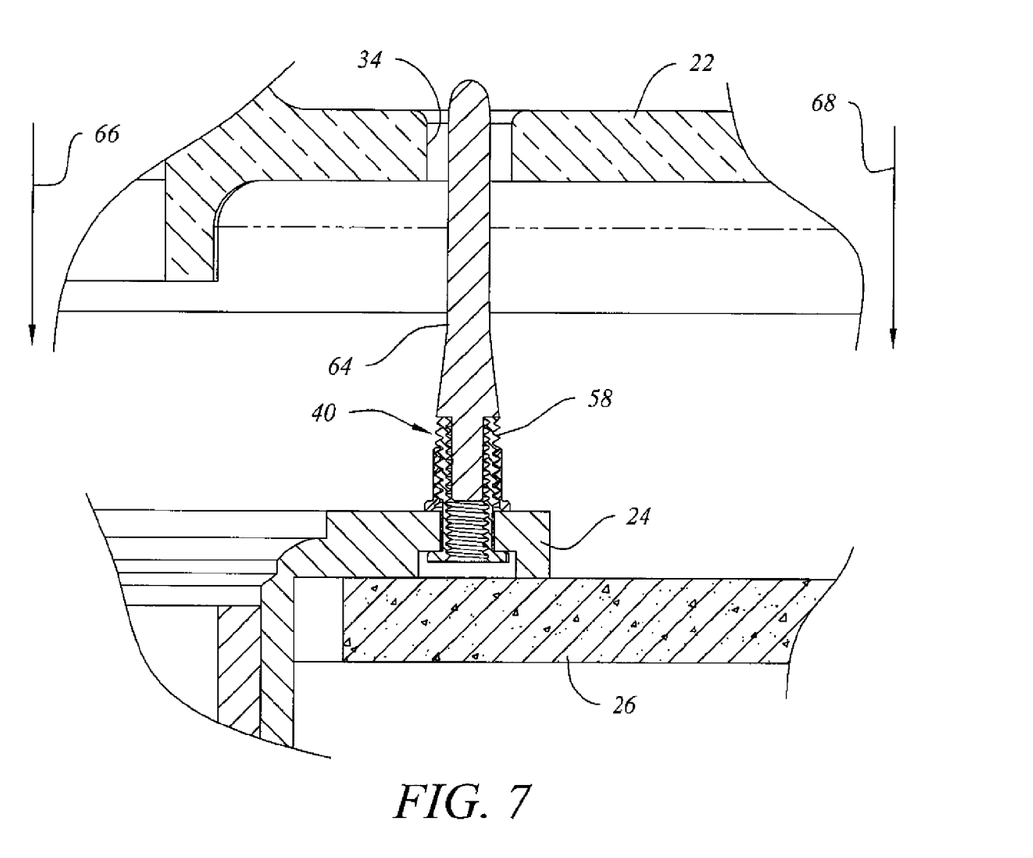
FIG. 7 is a detail cross-sectional front elevation view of the tee bolt, stabilizing collar, and an extension guide (or "bolt bullet") installed to facilitate alignment of the tee bolt with an aperture in toilet base.

Referring to FIG. 7, bolt guide 64 is optionally provided for use with or without an embodiment where extension member 52 is present to facilitate alignment of tee bolt 40 with bolt hole 34 when lowering toilet base 22 in relation to closet collar 24 and subfloor 26 as indicated by arrows 66, 68. Bolt guide 64, also referred to herein as a bolt bullet, can be threaded or otherwise configured to be frictionally and releasably engageable with tee bolt 40, and can be made of metal or a suitable polymeric material as desired. Once toilet base 22 is positioned over closet collar 24 as in FIG. 1, bolt guide 64 can be removed to facilitate engagement of hex-head bolt 44 with tee bolt 40.

Figure 8:
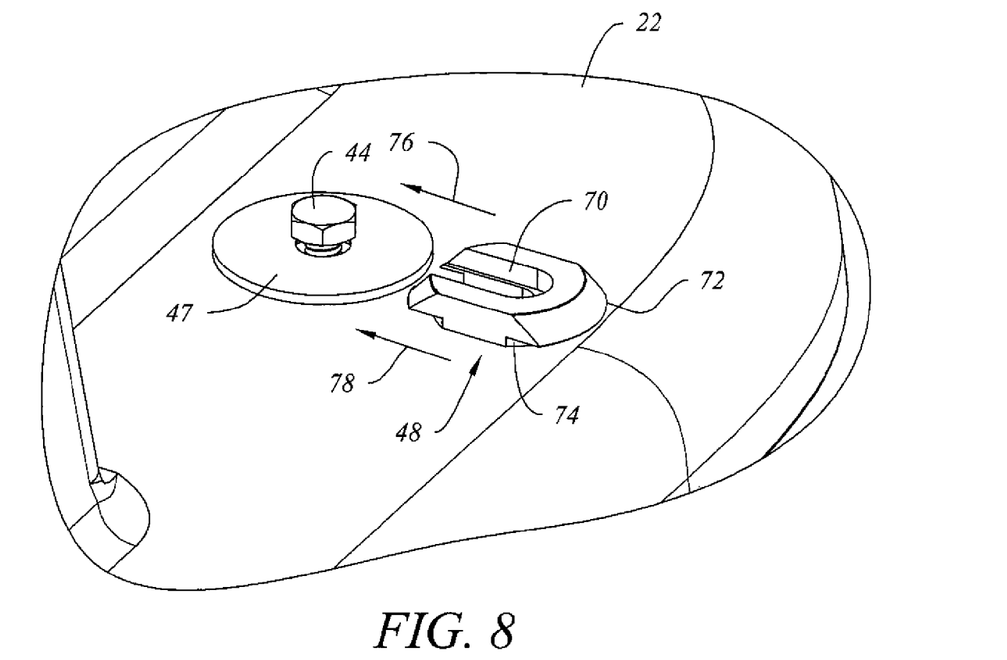
FIGS. 8-9 are detailed perspective views showing the application of one embodiment of a tightening tool of the invention to a hex head of a tightening member.
Figure 9:
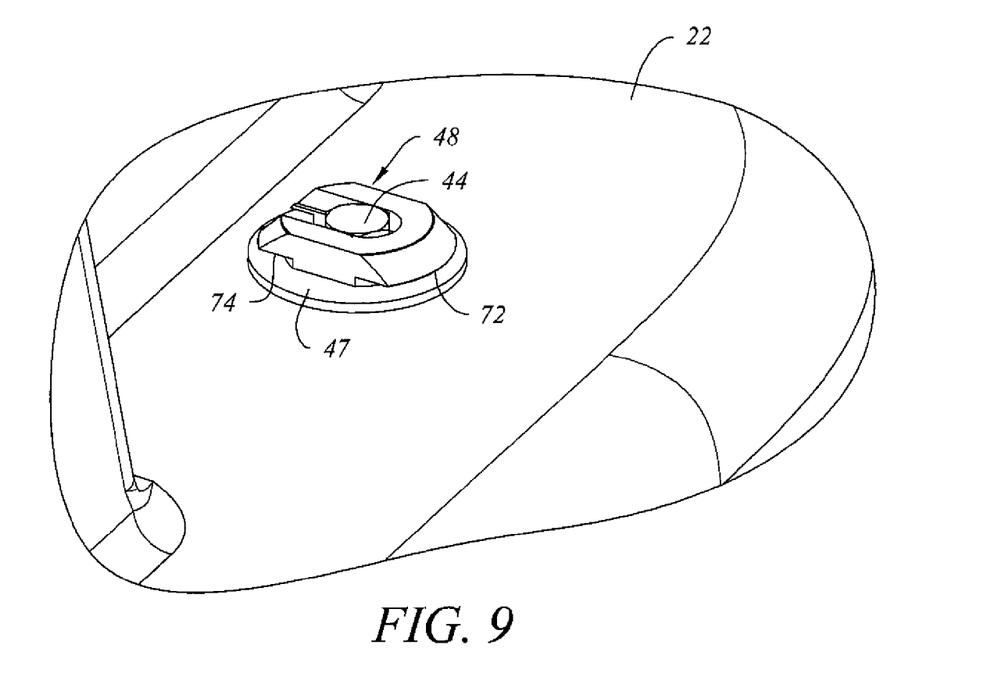
Figure 10:
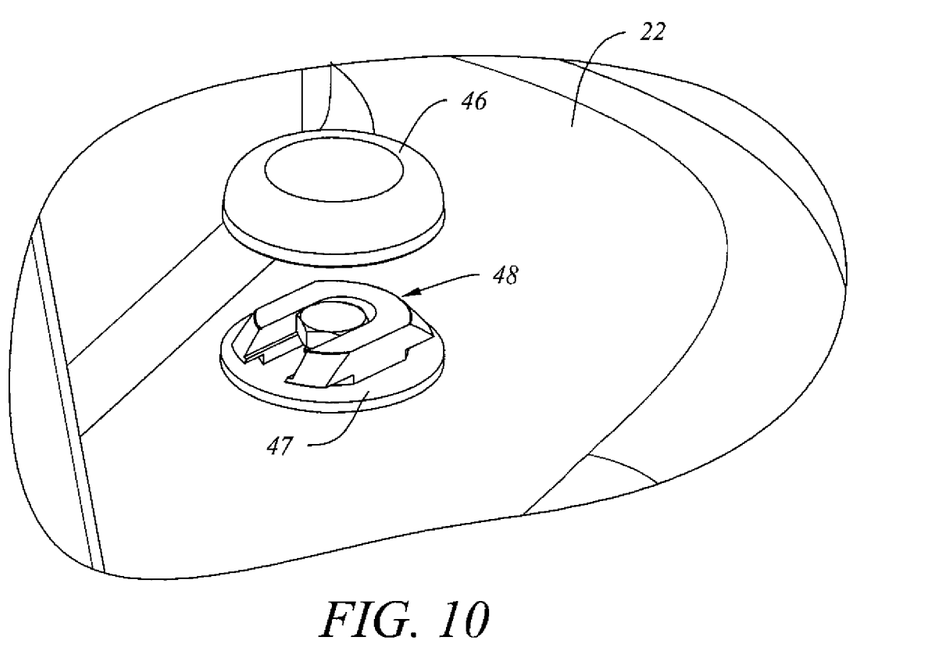
FIG. 10 is a detail perspective view of a cap in a position to be lowered into engagement with the tightening tool of FIGS. 8-9.
Figure 11:
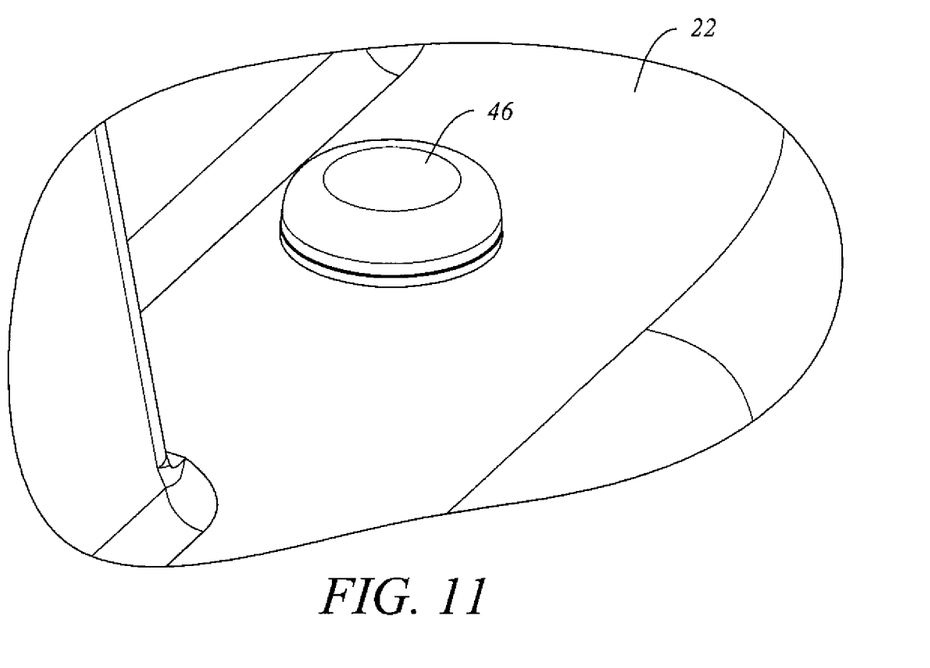
FIG. 11 is a detail perspective view as in FIG. 10 after the cap is engaged over the tightening tool.

Referring to FIGS. 3 and 8-11, hex-head bolt 44 or another similarly effective tightening member is inserted downwardly through an optional washer 47 and an aligned aperture in toilet base 22, and is threaded into upper section 54 of extension member 52 where provided, or into the internal bore of tee bolt 40 where an extension member 52 is not present. Tightening tool 48 is desirably configured to releasably engage the hex-head of hex-head bolt 44 or another similarly effective tightening member. Referring to FIGS. 3 and 8, a satisfactory tightening tool 48 for use in the invention comprises a U-shaped opening 70, front and rear edges 72, and undercuts 74. Referring to FIG. 8, tightening tool 48 is desirably slidable into releasable engagement around and under the head portion of hex-bolt 44 as indicated by arrows 76, 78. When positioned as shown in FIG. 9, tightening tool 48 can be rotated in a clockwise direction relative to toilet base 22 to apply torque to the head of hex-head bolt 44 to tighten hex-head bolt 44 in relation to tee bolt 40 or, if used, an extension member 52. The additional leverage provided by tightening tool 48 desirably avoids the need for use of a wrench or other tool to tighten the fastener assembly sufficiently to secure a toilet base 22 to an underlying support structure such as a closet collar 24 and subfloor 26 as previously described.

Referring to FIGS. 1-3 and 10-11, a low-profile decorative cap 46 is desirably provided that is releasably engageable with tightening tool 48 over optionally provided washer 47 to cover, conceal and protect the tightening member and tightening tool in an aesthetically pleasing relationship that facilitates cleaning during ongoing use.

Figure 12:
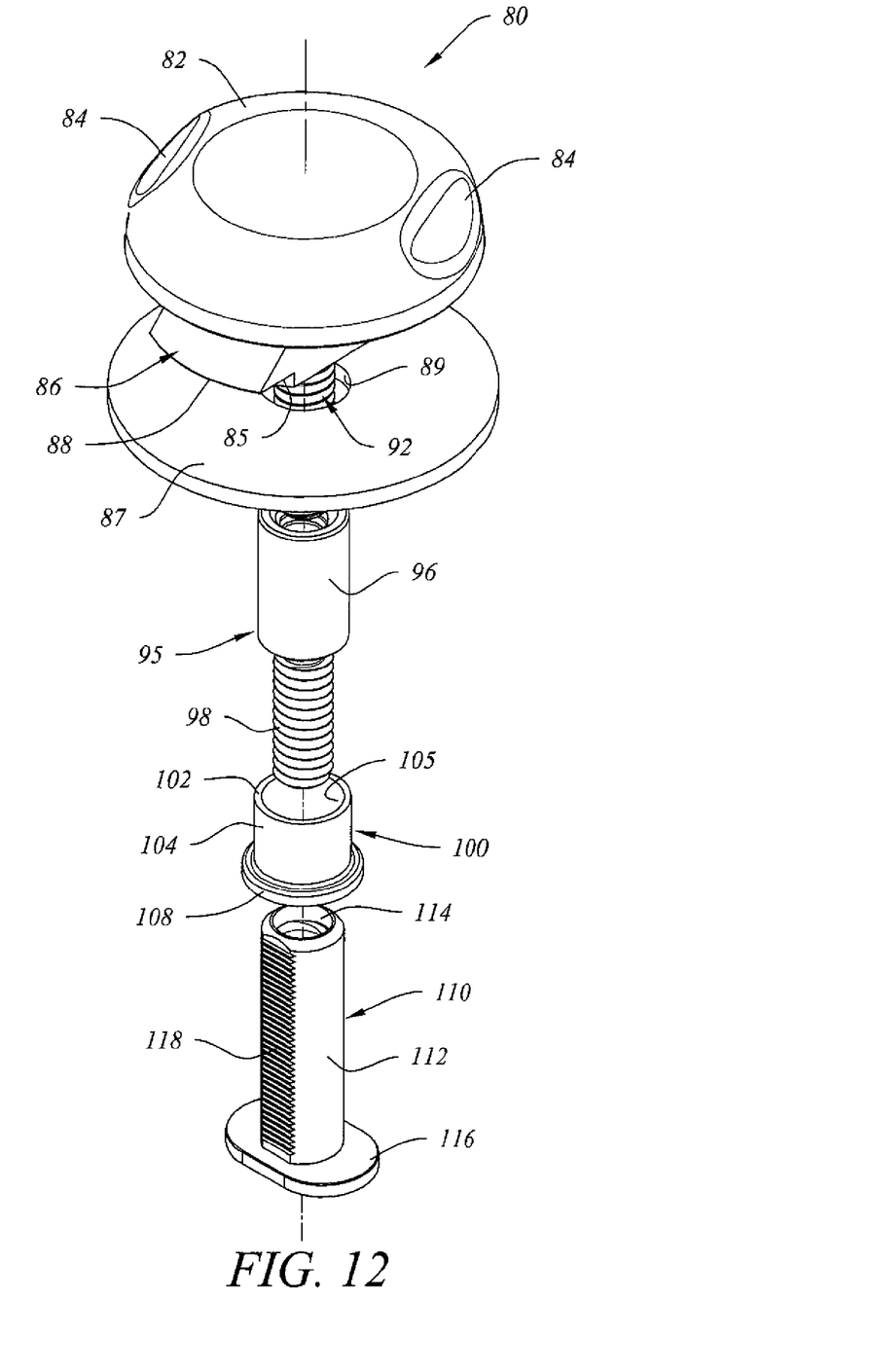
FIG. 12 is an enlarged perspective view of the components of another embodiment of the toilet fastener assembly of the invention made of plastic and having a differently configured tee bolt, stabilizing collar and cap.

Referring to FIG. 12, another embodiment of the invention is disclosed in which the parts are all made of known durable polymeric materials having physical properties and compositional components that are generally available and known to be suitable for use in the same or similar applications. As shown, toilet fastener assembly 80 comprises tee bolt 110 having a base 116 and a shaft portion having a threaded internal bore 114 and a ribbed outer surface 118 that is engageable with a cooperating structural element disposed inside the otherwise smooth inner surface of stabilizing collar 100.

Stabilizing collar 100 desirably further comprises a cylindrical sleeve section 102 with a larger diameter annular base 108. Cylindrical sleeve section 102 further comprises substantially smooth inner and outer surfaces 104, 105. Annular base 108 preferably comprises an inwardly facing projection 106 that provides frictional engagement with ribbed outer surface section 118 of tee bolt 110. An optional extension member 95 is provided comprising upper section 96 and an externally threaded lower section that is engageable with the threads inside bore 114 of tee bolt 40. Externally threaded tightening member 92 is shown inserted through an optional washer 87 and positioned to be threaded into upper section 96 of extension member 95, although it will be appreciated that tightening member 92 can also be cooperatively engaged with internal bore 114 of tee bolt 110 where extension member 95 is not present. Tightening tool 86 is shown as engaged with the upper portion (not visible) of tightening member 92, and low-profile toilet bolt cap 82 is disposed over the head of tightening member 92 and over tightening tool 86. Where cap 82 is configured to be twisted into releasable frictional engagement with tightening tool 86, opposed recesses 84 can be provided to facilitate gripping by the user. Tightening tool 86 desirably comprises edge sections 88 having undercuts 85 to facilitate either snap-fit or bayonet style engagement with cooperating structures (not shown) on the underside of cap 82.

Figure 13:
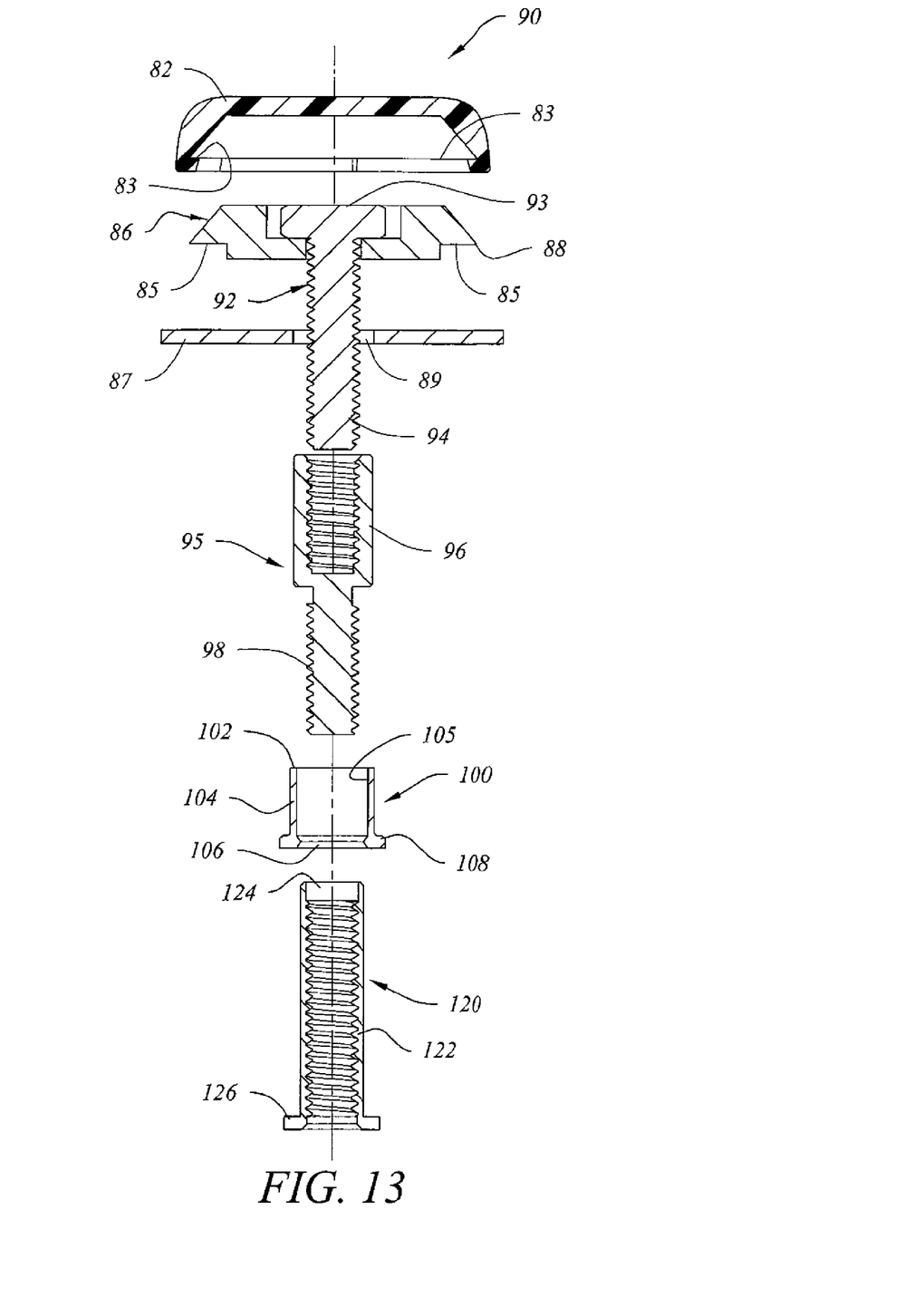
FIG. 13 is an exploded cross-sectional elevation view of another embodiment of the invention having a differently configured tee bolt.

Referring to FIG. 13, another toilet fastener assembly 90 is shown that comprises tee bolt 120 having a tubular portion with a smooth outer surface 122, a partially threaded internal bore 124 and a base 126. A stabilizing collar 100, extension member 95, tightening member 92, and tightening tool 86 as previously described in relation to FIG. 12 can be used with this embodiment of tee bolt 120 if desired. Toilet bolt cap 82 is shown in cross-section to depict inwardly facing projections disposed around the inside of the downwardly facing opening of cap 82 to engage edge 88 and undercut 85 portions of tightening tool 86.

Figure 14:
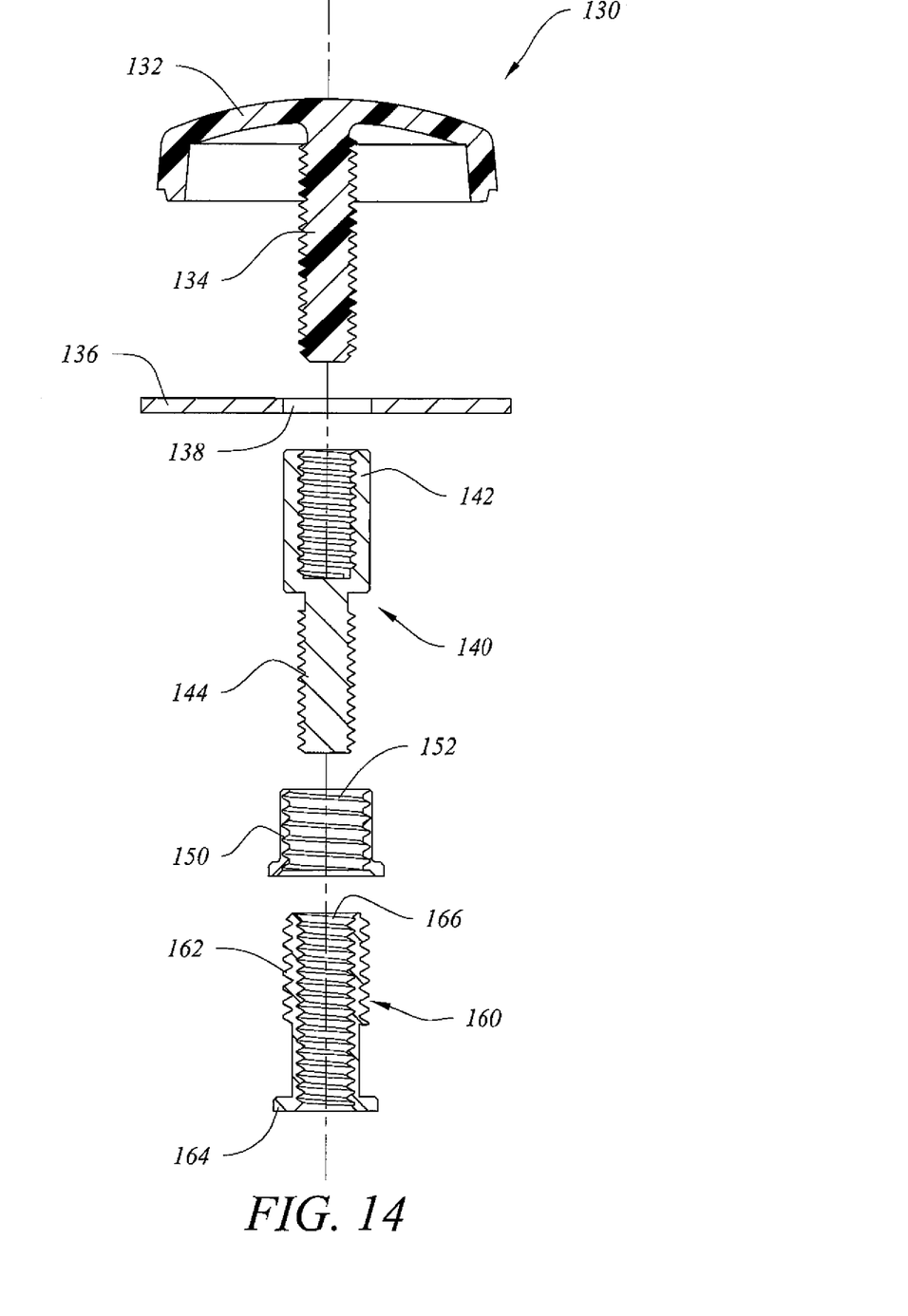
FIG. 14 is an exploded elevation view of another embodiment of the invention made from plastic and having a cap that is unitarily formed with the tightening member.

Referring to FIG. 14, another toilet fastener assembly 130 is disclosed that desirably comprises tee bolt 160 having base 164 and upwardly projecting shaft portion 162 that is internally and externally threaded. Stabilizing collar 150 comprising a smooth outside surface and a threaded internal bore 152 is optionally provided for engagement with tee bolt 160. An optional extension member 140 comprising upper and lower sections 142, 144 as previously described in relation to other embodiments of the invention, and a combination cap and tightening member 132 with a downwardly projecting, externally threaded shaft 134 insertable through opening 138 in optional washer 136 and into engagement with the internal bore of extension member 140 or tee bolt 120 is also desirably provided. The embodiments of FIGS. 12-14 are particularly preferred for use in a toilet fastener assembly in which all or a portion of the parts are made of a suitable polymeric material, but can also be utilized when constructed in metal or other similarly effective materials.

Other alterations and modifications of the invention will likewise become apparent to those of skill in the art upon reading this disclosure in relation to the accompanying drawings, and it is intended that the scope of the invention be limited only by the broadest interpretation of the appended claims to which the inventors are legally entitled.

What is claimed is:

1. An adjustable-length toilet fastener assembly useful for securing at least part of a toilet base to an underlying support structure including a closet collar having a flange portion, the toilet base comprising spaced-apart toilet bolt apertures extending through the toilet base to a height above the closet collar that can vary according to the toilet base selected by a user and the configuration of the support structure, the toilet fastener assembly comprising:
    a plurality of coaxially aligned fastener members cooperatively configured to be assembled in various lengths to accommodate the height of a toilet bolt aperture in the toilet base above the flange portion of the closet collar; the fastener members further comprising
    a tee bolt configured to be engageable with the flange portion of the closet collar,
    a stabilizing collar disposed around a portion of the tee bolt above the flange portion of the closet collar, and
    a tightening member further comprising a bolt section that is insertable downwardly into the toilet bolt aperture and a head section that is rotatable relative to the tee bolt to secure the toilet base to the closet collar; and
    a tightening tool configured to be manually manipulated by the user to apply torque to the bolt section of the tightening member, wherein the tightening tool is further configured to be attachable to and concealable under a toilet bolt cap.

2. The adjustable-length toilet fastener assembly of claim 1 wherein the plurality of coaxially aligned fastener members further comprises an extension member disposed between the tee bolt and the tightening member.

3. The adjustable-length toilet fastener assembly of claim 2 wherein the extension member comprises a first end that is threadedly engageable with the tee bolt and a second end that is threadedly engageable with the tightening member.

4. The adjustable-length toilet fastener assembly of claim 2 wherein the first and second ends of the extension member are differently threaded.

5. The adjustable-length toilet fastener assembly of claim 1 wherein the tightening tool is either an integral part of the tightening member or a unitarily formed part of the tightening member.

6. The adjustable-length toilet fastener assembly of claim 1 wherein the tightening tool is selectively engageable with the head section of the tightening member, and further comprising a toilet bolt cap that releasably engages the tightening tool.

7. The adjustable-length toilet fastener assembly of claim 6 wherein the toilet bolt cap is a low-profile decorative cap.

8. The adjustable-length toilet fastener assembly of claim 1 in combination with a washer disposed between the head section of the tightening member and the toilet base.

9. The adjustable-length toilet fastener assembly of claim 1 further comprising a bolt guide that is coaxially alignable with and releasably attachable to a portion of the toilet fastener assembly for use in coaxially aligning the tee bolt with the aperture in the toilet base prior to insertion of the bolt section of the tightening member downwardly through the aperture.

10. The adjustable-length toilet fastener assembly of claim 1 wherein the cooperatively configured fastener members are cooperatively threaded as needed to secure the toilet base to the flange portion of the closet collar.

11. The adjustable-length toilet fastener assembly of claim 1 wherein the tightening tool is configured to slidably engage the tightening member in a direction transverse to the coaxially aligned fastener members.

12. In a toilet fastener assembly useful for securing a toilet base to an underlying support structure, the improvement comprising a plurality of coaxially alignable and cooperatively engageable fastener members configured to make the toilet fastener assembly selectively adjustable in length to enable use with any of a plurality of underlying support structures and with toilet bases having toilet bolt apertures of different lengths and heights without cutting or breaking any of the fastener members.

13. In an adjustable-length toilet fastener assembly useful for securing a toilet base to an underlying support structure, the improvement comprising a tightening tool that is cooperatively engageable with another member of the adjustable-length fastener assembly and is configured to apply torque manually to the adjustable-length fastener assembly until the toilet base is secured to the underlying support structure, the tightening tool being further configured to be attachable to and concealable under a low-profile decorative toilet bolt cap.

14. The adjustable-length toilet fastener assembly of claim 13 in combination with a low-profile decorative toilet bolt cap that is selectively engageable with the tightening tool.

* * * * *